US012779592B2

(12) United States Patent
Payne et al.

(10) Patent No.: US 12,779,592 B2
(45) Date of Patent: Nov. 3, 2026

(54) AUTOMATED SLUG REMOVING METHOD AND DEVICE

(71) Applicant: GM GLOBAL TECHNOLOGY OPERATIONS LLC, Detroit, MI (US)

(72) Inventors: William P. Payne, Macomb, MI (US); Jerone Spencer Anderson, Harper Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 854 days.

(21) Appl. No.: 18/189,019

(22) Filed: Mar. 23, 2023

(65) Prior Publication Data

US 2024/0316696 A1 Sep. 26, 2024

(51) Int. Cl.
*B23K 26/38* (2014.01)
*B23K 26/16* (2006.01)

(52) U.S. Cl.
CPC .............. *B23K 26/38* (2013.01); *B23K 26/16* (2013.01)

(58) Field of Classification Search
CPC ............ B23K 26/0823; B23K 26/0093; B23K 26/16; B23K 26/36; B23K 26/38
See application file for complete search history.

(56) References Cited

U.S. PATENT DOCUMENTS

| | | | | |
|---|---|---|---|---|
| 6,003,418 | A | 12/1999 | Bezama et al. | |
| 2012/0111161 | A1* | 5/2012 | Kuriki | B23K 26/38 83/16 |
| 2014/0238962 | A1* | 8/2014 | Nawrodt | B26F 1/02 83/100 |
| 2015/0352671 | A1* | 12/2015 | Darzi | B23K 26/38 219/121.71 |
| 2019/0030649 | A1* | 1/2019 | Ruetz | B23K 26/384 |
| 2025/0214178 | A1* | 7/2025 | Mach | B23K 26/388 |

FOREIGN PATENT DOCUMENTS

DE 102013003118 A1 8/2014

* cited by examiner

*Primary Examiner* — Elton K Wong
(74) *Attorney, Agent, or Firm* — Ingrassia Fisher & Lorenz, LLP | IFL

(57) ABSTRACT

Methods and devices for processing tubular workpieces are provided. An exemplary method for processing a tubular workpiece includes providing instructions, with a computing device, for cutting the tubular workpiece according to a desired design; loading the tubular workpiece into a processing machine including a laser-cutting device and a punch bit; and operating the laser-cutting device, based on the instructions, to cut the tubular workpiece to form an opening and a slug in the opening. Further, the method includes operating the punch bit, based on the instructions, to punch the slug to remove the slug from the opening.

20 Claims, 7 Drawing Sheets

AUTOMATED SLUG REMOVING METHOD AND DEVICE

INTRODUCTION

The disclosure relates to laser-cutting methods and devices, and in particular to methods and devices for removing cut slugs from tubes.

Laser tube cutting machines typically include a workpiece moving device that holds a tube to be processed and moves the tube relative to a push-through device supporting the tube. A laser-cutting device is provided adjacent to the push-through device in a workspace and includes a processing head, through which a laser beam is directed onto the tube. In the workspace adjacent to the laser-cutting device, a tool holder is also provided to accommodate tools for processing of the tube. During processing of the tube, the tube is held by clamping jaws of the push-through device.

Certain applications call for laser-cutting small dimensional openings or openings having complicated shapes into tubes, and forming cut slugs in the openings. Accordingly, it is desirable to provide a cost-effective, time-efficient automated method and device for removing slugs from cut tubes. Furthermore, other desirable features and characteristics of the present disclosure will become apparent from the subsequent detailed description and the appended claims, taken in conjunction with the accompanying drawings and the foregoing introduction.

SUMMARY

Methods and devices for processing tubular workpieces are provided. In one embodiment, a method for processing a tubular workpiece includes providing instructions, with a computing device, for cutting the tubular workpiece according to a desired design; loading the tubular workpiece into a processing machine including a laser-cutting device and a punch bit; and operating the laser-cutting device, based on the instructions, to cut the tubular workpiece to form an opening and a slug in the opening. Further, the method includes operating the punch bit, based on the instructions, to punch the slug to remove the slug from the opening.

A method is provided for processing a tubular workpiece. In one embodiment, the method includes mounting a punch bit onto a spindle device of a processing machine, wherein the spindle device is located in a magazine of the processing machine; loading the tubular workpiece into the processing machine, wherein the processing machine includes a laser-cutting device; automatically operating the laser-cutting device to cut the tubular workpiece to form an opening and a slug in the opening; automatically selecting the punch bit and spindle device from the magazine with a tool holder; and automatically operating the punch bit and spindle device to punch the slug to remove the slug from the opening.

A machine is provided for processing a tubular workpiece. In one embodiment, a laser-cutting device configured to cut an opening in the tubular workpiece, wherein a cut slug is formed in the opening; a punch bit configured to push the cut slug out of the opening; and a computing device configured to instruct the laser-cutting device to automatically cut the tubular workpiece at selected locations and configured to automatically instruct the punch bit to push cut slugs out of the selected locations.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
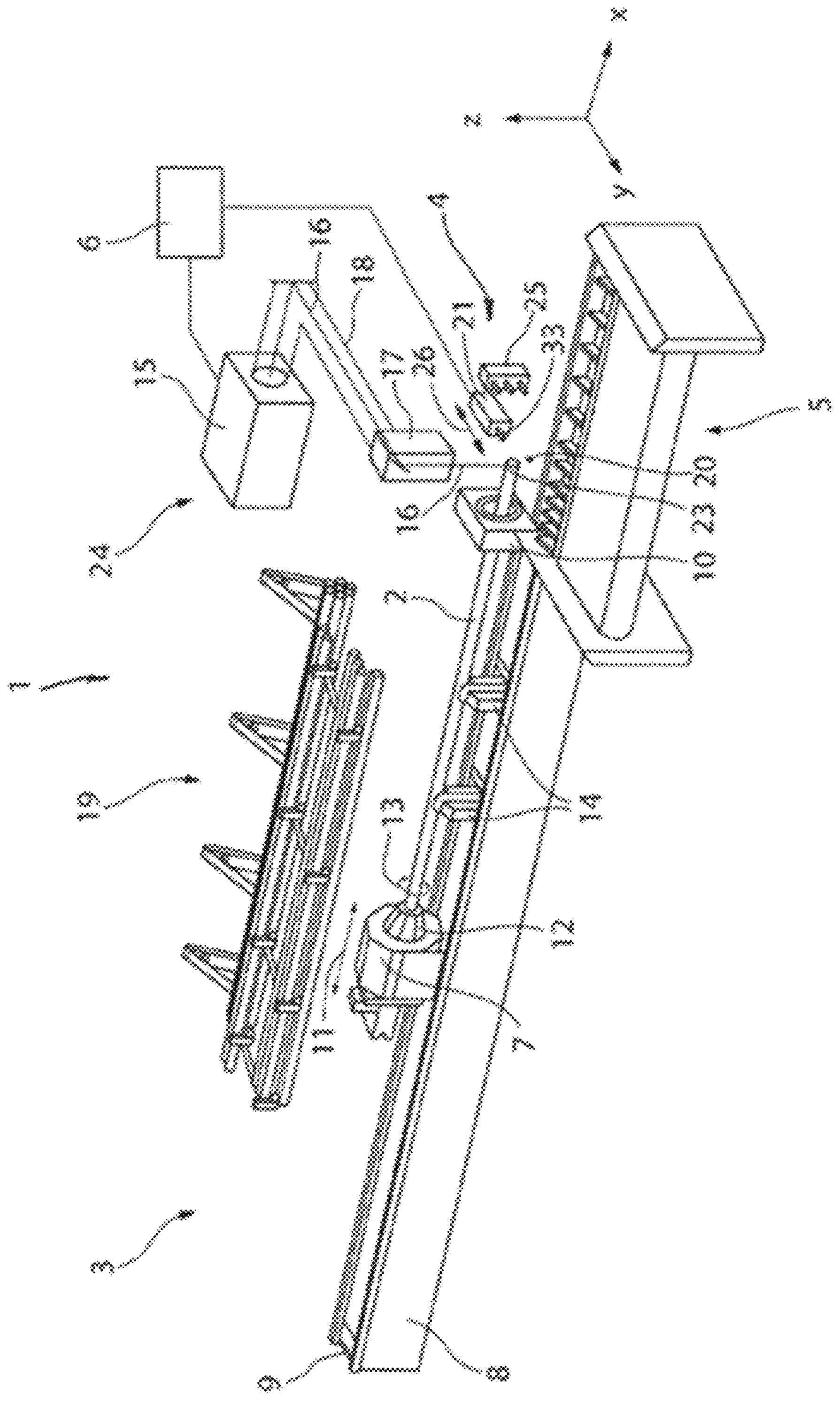
FIG. 1 is a perspective view of a processing machine, in accordance with exemplary embodiments.

Referring to FIG. 1, a schematically simplified processing machine 1 is illustrated. In certain embodiments, the processing machine 1 is a laser tube cutting machine 1 intended for the processing of rod-shaped or tubular workpieces 2. The processing machine 1 includes a feeding device 3 for laterally feeding the tubular workpiece 2 to be cut into the processing machine 1. Specifically, the feeding device 3 may include a loading device 19. In exemplary embodiments, the feeding device 3 feeds the tubular workpiece 2 to be cut to a workspace 20. In workspace 20, the tubular workpiece 2 is processed by a laser-cutting device 24 for laser-cutting of the tubular workpiece 2, and by a processing device 4, for mechanical processing with a tool 33. The finished processed tubular workpieces 2 are received by an unloading device 5 and discharged from the processing machine 1. All functions of the processing machine 1 are controlled by a control module or computing device 6.

In exemplary embodiments, the feeding device 3 includes a workpiece moving device 7, which may be a rotary device. Further, the feeding device may include a machine bed 8 with guide rails 9 and a push-through device 10. An exemplary workpiece moving device 7 is motor-driven and may be moved in a linear feed direction 11 on the guide rails 9. The tubular workpiece 2 to be fed is fixed by a clamping device 12 of the workpiece moving device 7. The clamping device 12 is rotatable in the direction of the double arrow 13. Further, an exemplary clamping device 12 encloses the fed tubular workpiece 2 and holds the tubular workpiece 2. The tubular workpiece 2 is supported by at least one workpiece support 14 integrated in the machine bed 8 while the tubular workpiece 2 is fed toward the push-through device 10 and/or during the processing of the tubular workpiece 2. In the area of the processing device 4, the tubular workpiece 2 is guided through and supported by the push-through device 10. The push-through device 10 is designed in such a way that the clamped tubular workpiece 2 is guided in the feed direction and is not clamped in a fixed position relative to the push-through device 10. For example, the tubular workpiece 2 is rotatable in the push-through device 10 in the rotational direction 13.

In exemplary embodiments, the laser-cutting device 24 includes a laser beam source 15 for generating a laser beam 16, a processing head 17, and a beam guide 18 that guides the laser beam 16 from the laser beam source 15 to the processing head 17. The laser beam 16 exits the processing head 17 and is focused onto the outer circumferential surface of the tubular workpiece 2 at a processing location 23 within the workspace 20. As shown, the laser beam 16, processing head 17, and beam guide 18 are operated by the control module or computing device 6.

Associated with the workspace 20 and/or adjacent to the machining head 17 is a tool holder 21 of the processing device 4, which may be moved by a guide 22 (FIG. 2) at least within the workspace 20, so that the tool holder 21 with a tool 33 clamped therein or otherwise engaged may be moved to and from the processing location 23. In an exemplary embodiment, the tool 33 may be a spindle device and the tool holder 21 may be configured to move the spindle device 33 in the Y-direction, X-direction, and Z-direction, and to rotate or spin the spindle about a tool axis.

A magazine 25 may also be provided at a distance from the processing location 23. This magazine 25 may be designed, for example, as a linear magazine or turret magazine. Various tools 33, such as spindles, punch bits, punch bits mounted to tools, drills, flow drills, tapping tools or thread forming tools, may be stored in this magazine 25. An exemplary tool holder 21 is movable in the Y-direction as indicated by double arrow 26, at least between the magazine 25 and the processing location 23. For the use of a linear magazine 25, the tool holder 21 may also be movable in the Z-direction. Alternatively, the magazine 25 may also be movable in the Z-direction.

In exemplary embodiments, the tool holder 21 is operated by the control module or computing device 6, such as to select the tool 33 for use from the magazine and to use the tool 33 on the tubular workpiece 2 during workpiece processing.

As shown, the unloading device 5 is provided at a distal end of the push-through device 10, which discharges workpiece parts or sections cut from the tubular workpiece 2 as well as a residual workpiece from the processing machine 1.

Figure 2:
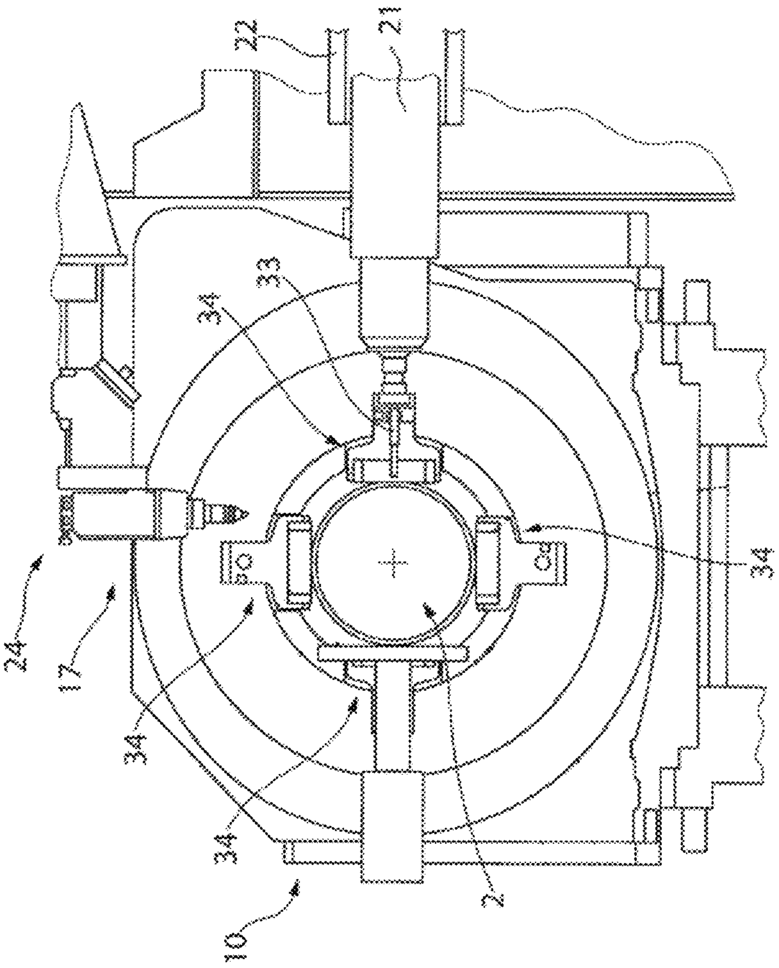
FIG. 2 is a schematic side view of a push-through device with a mechanical tool, in accordance with exemplary embodiments.

FIG. 2 shows a schematic side view of the push-through device 10. The push-through device 10 includes clamping jaws 34, which are accommodated resiliently in the push-through device 10. For example, four clamping jaws 34 are provided, which are arranged in pairs opposite one another and offset by 90° with respect to one another. The clamping jaws 34 guide the tubular workpiece 2 for laser-cutting processing.

Figure 3:
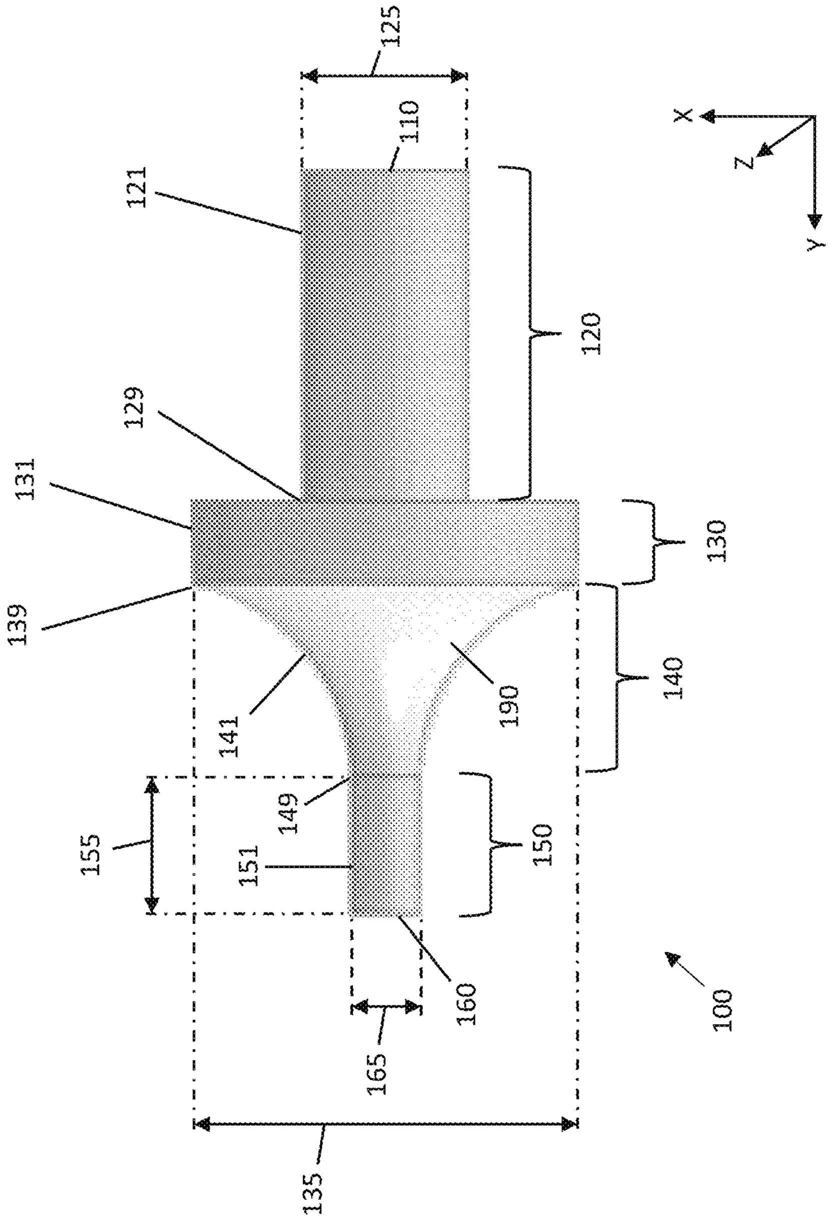
FIG. 3 is a perspective view of a punch bit for use in the machine of FIGS. 1-2, in accordance with exemplary embodiments.

Referring now to FIG. 3, a perspective side view illustrates a punch tool or punch bit 100 provided for use as one of the tools 33 in the device of FIGS. 1-2. As shown, punch bit 100 has an exterior surface 190 and extends from a proximal end 110 to a distal end 160. Further, punch bit 100 includes a proximal portion 120 forming the proximal end 110, a distal portion 150 forming the distal end 160, a collar portion 130 adjacent the proximal portion 120, and a tapered portion 140 located between the collar portion 130 and the distal portion 150.

An exemplary proximal end 110 may be formed as a hollow end or with another engagement structure to facilitate attachment to another tool 33 or grasping by the tool holder 21. Further, in exemplary embodiments, the proximal portion 120 is a cylindrical shaft with a constant outer diameter 125 such that the proximal portion 120 has a level profile 121. In exemplary embodiments, outer diameter 125 is from 5 to 10 mm, such as about 6 mm.

As shown, the collar portion 130 contacts the proximal portion 120 at an interface 129. An exemplary collar portion 130 is cylindrical with a constant outer diameter 135 such that the collar portion 130 has a level profile 131. As shown in FIG. 3, the collar portion 130 is formed with a greater outer diameter than the proximal portion 120. In certain embodiments, outer diameter 135 of the collar portion 130 may be from 12 to 15 mm.

In FIG. 3, the tapered portion 140 contacts the collar portion 130 at an interface 139. Further, the tapered portion 140 contacts the distal portion 150 at an interface 149. An exemplary tapered portion 140 is a portion of a curved cone or funnel having an outer diameter that decreases from the interface 139 to the interface 149. As shown, the tapered portion 140 has a tangential curve or arc profile 141. In exemplary embodiments, the tapered portion 140 has, at the interface 139, the same outer diameter 135 as the collar portion 130.

As shown, the distal portion 150 contacts the tapered portion 140 at the interface 149. An exemplary distal portion 150 is cylindrical with a constant outer diameter such that the distal portion 150 has a level profile 151. As shown in FIG. 3, the distal portion 150 is formed with an outer diameter 165. Further, at the interface 149, the outer diameter of the tapered portion 140 is equal to the outer diameter 165 of the distal portion 150.

In exemplary embodiments, outer diameter 165 is smaller than the outer diameter 125 of the proximal portion 120. In exemplary embodiments, outer diameter 165 is 2.5 millimeters. In exemplary embodiments, outer diameter 165 is 1.5 mm, at least 1.5 mm, at least 1.75 mm, at least 2 mm, at least 2.25 mm, or at least 2.5 mm. In exemplary embodiments, outer diameter 165 is at most 5 mm, at most 4.5 mm, at most 4 mm, at most 3.5 mm, at most 3.25 mm, at most 3 mm, at most 2.75 mm, or at most 2.5 mm.

As shown, the distal portion 150 has an axial length 155, in the direction of the Y-axis, from interface 149 to distal end 160. In exemplary embodiments, the length 167 of distal portion 150 is 5 mm. In exemplary embodiments, length 167 is at least 3 mm, at least 4 mm, or at least 5 mm. In exemplary embodiments, length 167 is at most 8 mm, at most 6 mm, at most 5.5 mm, at most 5 mm, at most 4.5 mm, at most 4 mm, at most 3.5 mm, at most 3.25 mm, at most 3 mm, at most 2.75 mm, or at most 2.5 mm.

In exemplary embodiments, the punch bit 100 is monolithic, i.e., a unitary piece formed from a single material. In exemplary embodiments, punch bit 100 is tool steel.

Figure 4:
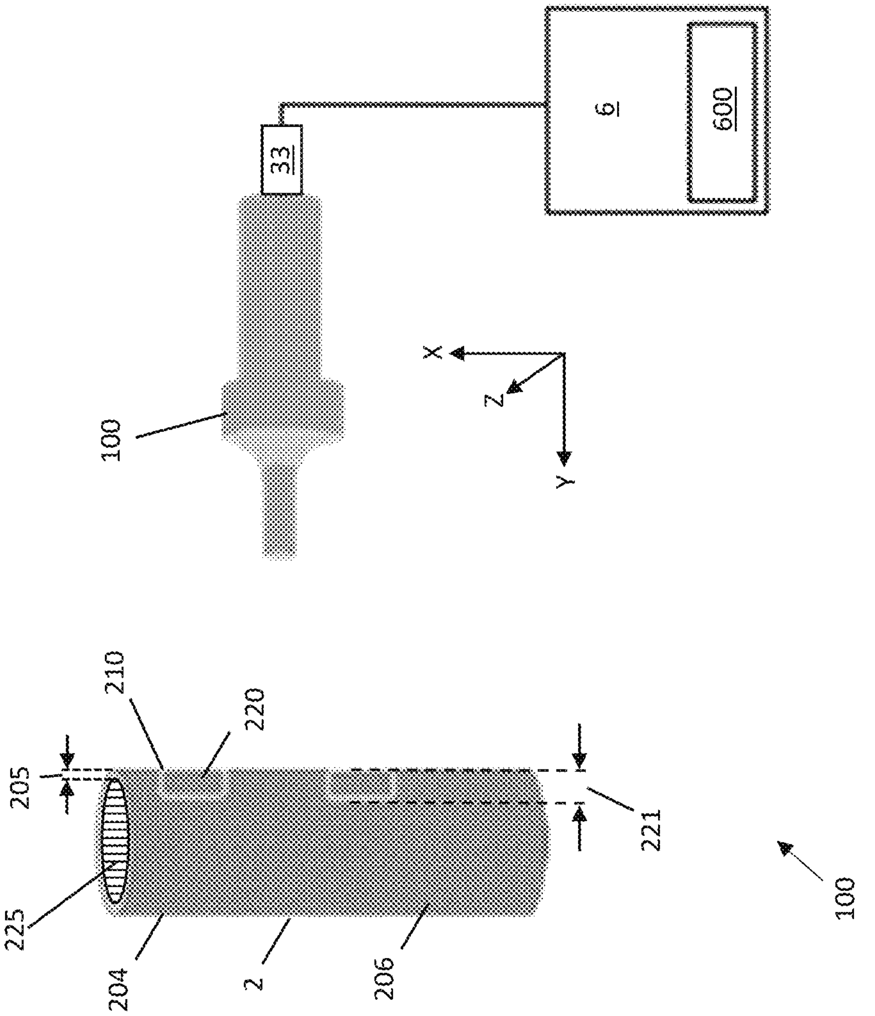
FIGS. 4-6 are schematic views of stages of an operation for removing slugs from openings in a tubular workpiece with the punch bit of FIG. 3, in accordance with exemplary embodiments.

FIG. 4 is a schematic illustrating a portion of a tubular workpiece 2 after laser-cutting and before operating the spindle 33 and punch bit 100 to dislodge cut slugs 220 from the laser-cut openings 210. While not shown, at such a fabrication stage the tubular workpiece 2 is still held by the push-through device 10, such as by the clamping jaws 34.

An exemplary tubular workpiece 2 is formed from aluminum, steel, stainless steel, brass, bronze, copper, or titanium, or other suitable material. As shown, the tubular workpiece 2 is a right circular cylinder, though the tubular workpiece may be another suitable shape, particularly a hollow shape.

The tubular workpiece 2 has an annular wall 204 with an outer surface 206. Further, the tubular workpiece 2 defines an internal space 225 surrounded by the annular wall 204. An exemplary annular wall 204 has a substantially uniform radial thickness 205. In exemplary embodiments, the radial thickness 205 is at least 0.5 mm, at least 1 mm, at least 1.5 mm, at least 2 mm, at least 2.5 mm, at least 3 mm, at least 3.5 mm, at least 4 mm, at least 4.5, or at least 5 mm. In exemplary embodiments, the radial thickness 205 is at most 5 mm, at most 4.5 mm, at most 4 mm, at most 3.5 mm, at most 3 mm, at most 2.5 mm, at most 2 mm, at most 1.5 mm, or at most 1 mm.

In FIG. 4, the laser-cutting device 24 (not shown) has cut two openings 210 into the tubular workpiece 2. The openings 210 extend from the outer surface 206 through the annular wall 204 and to the internal space 225 to define slugs 220. Though the slugs 220 are separated from the tubular workpiece 2, in FIG. 4, the slugs 220 remain in the openings 210, for example, due to friction fit.

As shown, each slug 220 has a minimum surface dimension 221 along the outer surface 206. In FIG. 4, the minimum surface dimension 221 is located in a Z-Y plane; however, it is contemplated that the opening 210 and slug 220 may be formed with a complicated shape. Further, for openings 210 and slugs 220 with complicated shapes, different portions of the openings 210 and slugs 220 may have relative minimum surface dimensions 221. Generally, the minimum surface dimension 221 is the smallest distance on the outer surface 206 that terminates on both ends at the opening 210. In exemplary embodiments, the minimum surface dimension 221 is at least 2 mm, at least 2.5 mm, at least 3 mm, at least 3.5 mm, at least 4 mm, or at least 4.5 mm. In exemplary embodiments, the minimum surface dimension 221 is at most 5 mm, at most 4.5 mm, at most 4 mm, at most 3.5 mm, at most 3 mm, at most 2.5 mm, or at most 2 mm.

It has been found that slugs 220 having a minimum surface dimension 221 less than or close to the radial thickness 205 are more likely to remain lodged in the openings 210 after laser-cutting.

As indicated above, the laser-cutting device 24 of FIG. 1 is operated by the control module or computing device 6. For example, the control module or computing device 6 may have a memory 600 which stores instructions or directions for cutting the openings 210. Specifically, the memory may store instructions indicate the location, size, shape, depth, and other data needed to cut the openings with the laser-cutting device 24.

Further, as shown in FIG. 4, the control module or computing device 6 is provided to instruct the tool holder (not shown) to grasp or engage the tool 33 on which the punch bit 100 is mounted and to punch the slugs 220 out of the openings 210.

Figure 5:
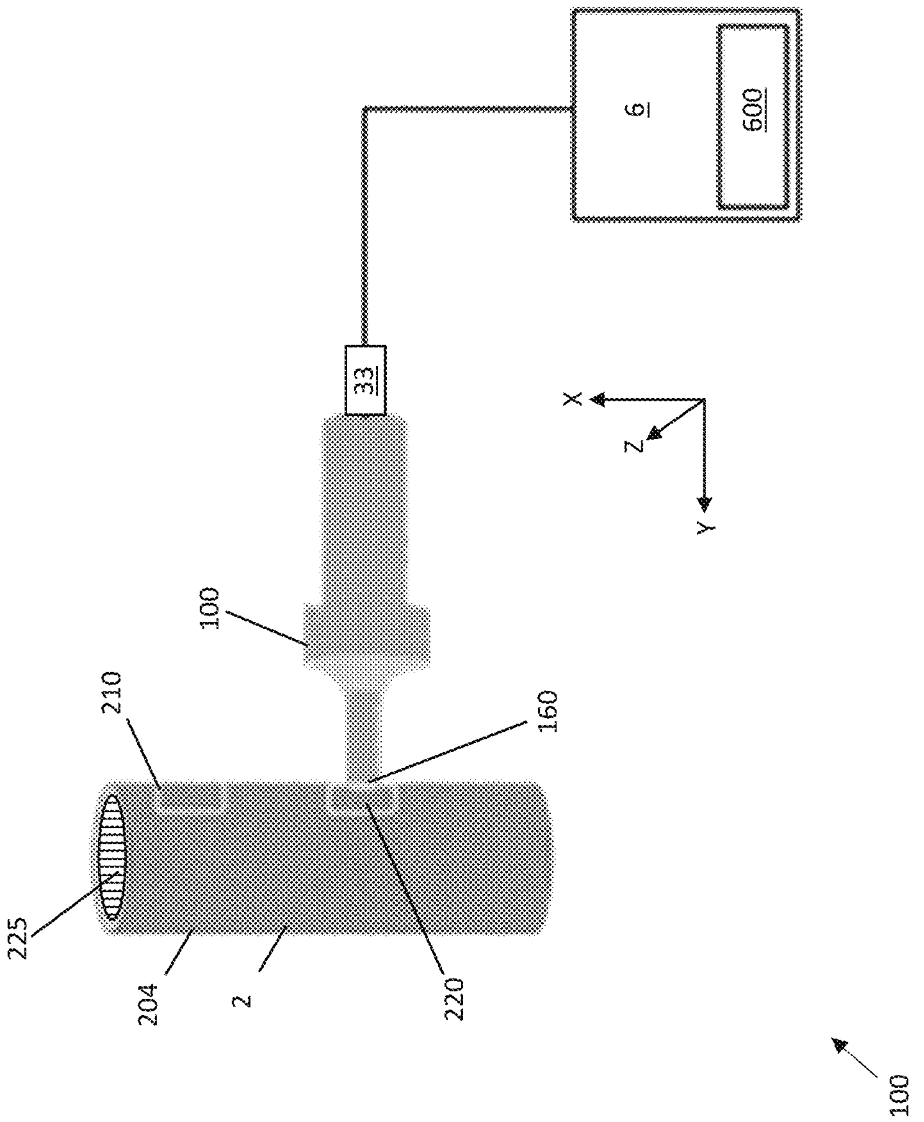

Referring to FIG. 5, it may be seen that the tool holder (not shown) has moved the tool 33 and punch bit 100 the appropriate distances in the X-direction, the Y-direction, and the Z-direction to contact a slug 220 in an opening 210 formed in the tubular workpiece 2. While not shown, at such a fabrication stage the tubular workpiece 2 is still held by the push-through device 10, such as by the clamping jaws 34. Further advancement of the punch bit 100 in the Y-direction and into the opening 210 will dislodge the slug 220 from the opening 210 and into the internal space 225. It is contemplated that the control module or computing device 6 may instruct the tool holder to advance the punch bit 100 in the Y-direction into the opening 210, and into the internal space 225, and to move in the X-direction and/or Z-direction in a pattern, such as side-to-side or in a circle pattern, to ensure that the punch bit 100 dislodges the slug 220 from the opening 210 in the tubular workpiece 2. In exemplary embodiments, the punch bit 100 advances into the opening 210 by a distance of at least the thickness of the tubular workpiece 2. In other exemplary embodiments, the punch bit 100 advances by a distance greater than the thickness of the tubular workpiece 2 such that the distal end 160 of the punch bit 100 is located in the internal space 225 of the tubular workpiece 2.

Figure 6:
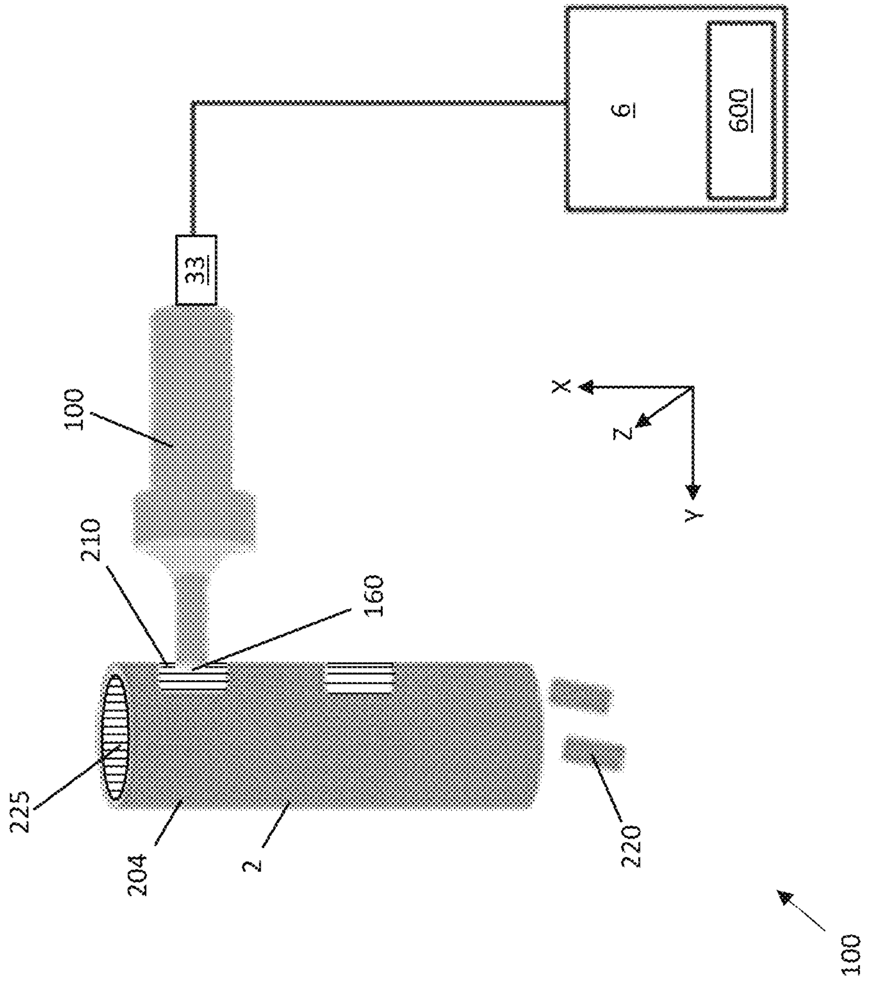

Referring to FIG. 6, the punch bit 100 has dislodged the first slug 220 and the tool 33 and punch bit 100 have been moved by the tool holder such that the distal end 160 of the punch bit 100 is in the second opening 210 and has dislodged the second slug 220. While not shown, at such a fabrication stage the tubular workpiece 2 is still held by the push-through device 10, such as by the clamping jaws 34. Upon being dislodged, the slugs 220 may fall, such as in the X-direction, within the tubular workpiece 2 and away from the openings 210. The processing machine 1, shown in FIG. 1, may apply a vacuum force to the internal space 225.

The dimension, shape, and profile of the punch bit 100 is provided to accommodate use in punching out small slugs 220, such as slugs having a minimum dimension of at least 2 mm, at least 2.5 mm, at least 3 mm, at least 3.5 mm, at least 4 mm, or at least 4.5 mm; and of at most 5 mm, at most 4.5 mm, at most 4 mm, at most 3.5 mm, at most 3 mm, at most 2.5 mm, or at most 2 mm. Further, due to the shape and profile, the punch bit 100 is able to withstand the pressure of the push force from the tool holder 21 against the tubular workpiece 2. Specifically, it has been found that the punch bit 100 does not shatter or bend during use for at least one thousand operations to punch out slugs 220 due to the dimension, shape, and profile of the punch bit 100.

Figure 7:
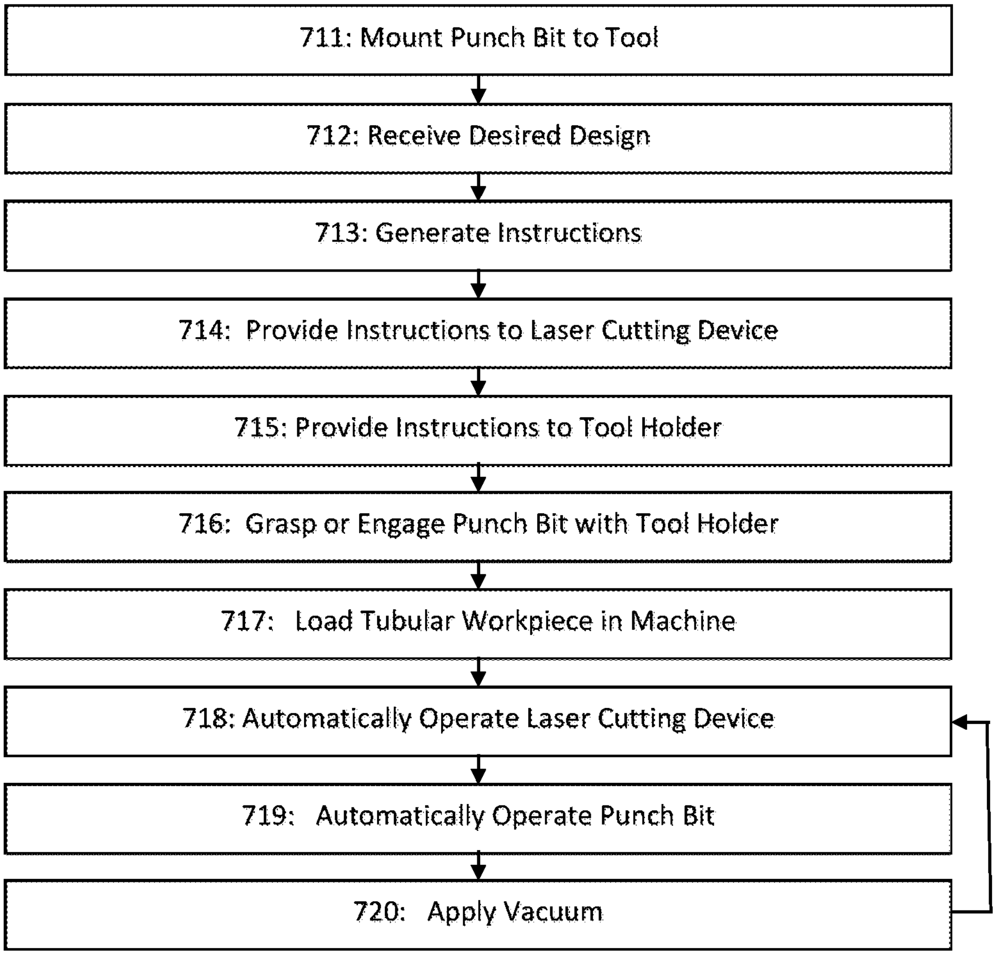
FIG. 7 is a flow chart illustrating a method for processing a tubular workpiece, in accordance with exemplary embodiments.

Referring now to FIG. 7, a method 700 for processing a tubular workpiece 2 is illustrated. In FIG. 7, the method includes mounting 711 a punch bit 100 onto a tool 33, such as a spindle device 33, of a processing machine 1. In exemplary embodiments, the spindle device 33 is located in a magazine 25 of the processing machine 1. The punch bit

100 may be press fit onto the spindle device 33 or otherwise secured to the spindle device 33.

Method 700 may further include receiving 712, on a computing device 6, a shape, orientation, size, and location of a desired opening to be formed in a desired design, and a number of desired finished products having the desired design. For example, a machine operator may input the shape, orientation, size, and location of a desired opening and the number of desired finished products. Alternatively, an optic device may optically scan and obtain the shape, orientation, size, and location of a desired opening.

Method 700 may also include generating 713, on the computing device 6, instructions for cutting the tubular workpiece according to the desired design. The instructions may be generated according to rules or programs saved in a memory 600 accessible by the computing device 6. Further, the instructions may be saved in the memory 600.

Method 700 may include providing 714 the instructions from the computing device 6 to a laser-cutting device 24 in the processing machine 1.

Further, method 700 may include providing 715 the instructions from the computing device 6 to the punch bit 100 and/or tool holder 21.

In response to the instructions, method 700 may include grasping or engaging 716 the punch bit 100, or the tool 33 on which the punch bit 100 is mounted, with the tool holder 21 and removing the punch bit 100 from the magazine 25.

Further, method 700 may include loading 717 a tubular workpiece 2 into the processing machine 1.

Method 700 continues with automatically operating 718 the laser-cutting device 24 to cut the tubular workpiece 2 to form an opening 210 and a slug 220 in the opening 210, according to the instructions.

Method 700 continues with automatically operating 719 the punch bit and spindle device with the tool holder to punch the slug 220 to remove the slug 220 from the opening 210.

Method 700 may include applying 720 a vacuum force to move the slug 220 to a desired destination after removing the slug 220 from the opening 210.

Method 700 may repeat automatically operating 718 the laser-cutting device 24 to cut the tubular workpiece 2 to form additional openings 210 and slugs 220 in the openings 210; and automatically operating 719 the punch bit and spindle device to punch the slugs 220 to remove the slugs 220 from the openings 210. In this manner, a highly repeatable and efficient process may be performed by the machine to form finished workpieces with openings 210, and in which the slugs 220 have been automatically removed.

As described herein, an automatic slug removal method utilizes an automatic slug removal device to reach laser-cut locations or openings and a specially designed punch bit to push slugs out of the cut locations or openings.

In exemplary embodiments, the automatic slug device provides for control of punch bit with programmable three-axis movement.

With the size, shape, and profile of the punch bit, the punch bit is able to punch slugs from small opening features, including non-round openings. An exemplary punch bit has a collared shaft that rapidly tapers down to 2.5 mm to be able to perform a punch out on very small laser-cut opening features.

Further, in exemplary embodiments, the punch bit may be added to a magazine for holding tools 33 in a processing machine, such as by mounting on a spindle device. The tool holder may grasp or engage the punch bit/spindle device and advance the distal end of the punch bit into contact with slugs for removal from a tubular workpiece.

In an exemplary embodiment, programming of a processing machine is revised to automatically include a slug removal process using the punch bit described herein. Specifically, the processing machine instructs the laser-cutting device to cut openings into the tubular workpiece at selected locations and then instructs the tool holder to advance the punch bit into contact with the slugs at the selected locations to remove the cut slugs from the cut openings.

In summary, embodiments herein provide for automatic removal of slugs from laser-cut tubular workpieces in an automated workflow. Further embodiments provide for use of a punch bit having a selected size, shape, and profile to withstand forces imposed by pushing the punch bit into contact with a laser-cut tubular workpiece.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements without departing from the scope of the disclosure as set forth in the appended claims and the legal equivalents thereof.

What is claimed is:

1. A method for processing a tubular workpiece, comprising:

providing instructions, with a computing device, for cutting the tubular workpiece according to a desired design;

loading the tubular workpiece into a processing machine comprising a laser-cutting device and a punch bit, wherein the tubular workpiece has an annular wall defining an internal space;

operating the laser-cutting device, based on the instructions, to cut the tubular workpiece to form an opening extending through the annular wall and a slug in the opening, wherein the slug is completely separated from the tubular workpiece and remains in the opening after being completely separated; and operating the punch bit, based on the instructions, to punch the slug to remove the slug from the opening by pushing the slug from the opening into the internal space.

2. The method of claim 1, further comprising:

receiving, on the computing device, a shape, orientation, size, and location of a desired opening to be formed in the desired design; and generating, on the computing device, the instructions for cutting the tubular workpiece according to the desired design.

3. The method of claim 1, further comprising applying a vacuum force to move the slug to a desired destination after removing the slug from the opening.

4. The method of claim 1, further comprising mounting the punch bit on a tool holder, wherein operating the punch bit, based on the instructions, to punch the slug to remove the slug from the opening comprises operating the tool holder to advance the punch bit along a first axis into the opening and to move the punch bit along at least one of a second axis and a third axis to dislodge the slug from the opening.

5. The method of claim 4, wherein operating the tool holder comprises advancing the punch bit along the first axis by a distance at least equal to a thickness of the annular wall such that a distal end of the punch bit enters the internal space, and moving the punch bit along both the second axis and the third axis to dislodge the slug from the opening.

6. The method of claim 1, wherein the tubular workpiece has an annular thickness in a radial direction, wherein the slug is formed with a minimum dimension of 2 millimeters (mm), and wherein the minimum dimension is in an axial direction less than the annular thickness.

7. The method of claim 6, wherein the punch bit comprises a distal end with a diameter of no more than 1.5 millimeters (mm), and wherein the punch bit includes a proximal portion forming a proximal end, a collar portion adjacent the proximal portion and having a greater outer diameter than the proximal portion, a tapered portion adjacent the collar portion, and a distal portion forming the distal end and having a constant outer diameter smaller than an outer diameter of the proximal portion.

8. The method of claim 1, wherein the slug is formed with a minimum dimension of 3 millimeters (mm).

9. The method of claim 8, wherein the punch bit comprises a distal end with a diameter of no more than 2.5 millimeters (mm), and wherein the punch bit has a distal portion extending from the distal end to a tapered portion, wherein the distal portion has constant diameter of no more than 5 millimeters (mm).

10. The method of claim 1, wherein the slug remains in the opening due to friction between the slug and the annular wall of the tubular workpiece after the laser-cutting device completes cutting of the opening.

11. A method for processing a tubular workpiece, comprising:

- mounting a punch bit onto a spindle device of a processing machine, wherein the spindle device is located in a magazine of the processing machine, and wherein the punch bit includes a proximal portion forming a proximal end, a collar portion adjacent the proximal portion and having a greater outer diameter than the proximal portion, a tapered portion adjacent the collar portion, and a distal portion forming a distal end and having a constant outer diameter smaller than an outer diameter of the proximal portion;
- loading the tubular workpiece into the processing machine, wherein the processing machine comprises a laser-cutting device;
- automatically operating the laser-cutting device to cut the tubular workpiece to form an opening and a slug in the opening;
- automatically selecting the punch bit and spindle device from the magazine with a tool holder; and
- automatically operating the punch bit and spindle device to punch the slug to remove the slug from the opening.

12. The method of claim 11, wherein the tubular workpiece has an annular thickness in a radial direction, and wherein the slug is formed with a minimum dimension in an axial direction less than the annular thickness.

13. The method of claim 11, wherein the slug is formed with a minimum dimension of 2 millimeters (mm).

14. The method of claim 11, wherein the punch bit is monolithic and formed from tool steel.

15. The method of claim 11, wherein the slug is formed with a minimum dimension of 3 millimeters (mm).

16. The method of claim 15, wherein the distal end has a diameter of no more than 2.5 millimeters (mm), and wherein the constant outer diameter is no more than 5 millimeters (mm).

17. The method of claim 16, wherein the collar portion is cylindrical with a constant outer diameter of from 12 to 15 millimeters, wherein the tapered portion has the same outer diameter as the collar portion at an interface between the collar portion and the tapered portion, and wherein the tapered portion has a curved arc profile decreasing in outer diameter from the interface to the distal portion.

18. A machine for processing a tubular workpiece, comprising:

- a laser-cutting device configured to cut openings in the tubular workpiece, wherein cut slugs are formed in the openings;
- a punch bit configured to push the cut slugs out of the openings; and
- a computing device configured to instruct the laser-cutting device to automatically cut the tubular workpiece at selected locations such that the cut slugs are completely separated from the tubular workpiece and remain in the openings after being completely separated, and configured to automatically instruct the punch bit to push completely separated cut slugs out of the selected locations and into an internal space of the tubular workpiece by moving the punch bit along at least two axes.

19. The machine of claim 18, wherein the computing device is configured to instruct the punch bit to move along three axes to contact the completely separated cut slugs and push the completely separated cut slugs into the internal space.

20. The machine of claim 18 wherein the laser-cutting device is configured to form each cut slug with a minimum dimension of 3 millimeters (mm), wherein the punch bit comprises a distal end with a diameter of no more than 2.5 millimeters (mm), wherein the punch bit has a distal portion extending from the distal end to a tapered portion, wherein the distal portion has a constant outer diameter of no more than 5 millimeters (mm), wherein the punch bit includes a proximal portion forming a proximal end and a collar portion adjacent the proximal portion, wherein the collar portion has a greater outer diameter than the proximal portion, wherein the tapered portion is adjacent the collar portion, and wherein the constant outer diameter of the distal portion is smaller than an outer diameter of the proximal portion.

* * * * *